(12) United States Patent
Sadka (10) Patent No.: US 6,573,917 B2
(45) Date of Patent: Jun. 3, 2003

(54) CALENDAR WITH SELF-HELP MESSAGING BASED UPON COLOR PREFERENCES

(75) Inventor: Dewey G. Sadka, Atlanta, GA (US)

(73) Assignee: Energia, Inc., Atlanta, GA (US)

( * ) Notice: Subject to any disclaimer, the term of this patent is extended or adjusted under 35 U.S.C. 154(b) by 78 days.

(21) Appl. No.: 09/808,417

(22) Filed: Mar. 14, 2001

(65) Prior Publication Data

US 2002/0036644 A1 Mar. 28, 2002

Related U.S. Application Data

(63) Continuation-in-part of application No. 09/637,544, filed on Aug. 11, 2000, and a continuation-in-part of application No. 09/637,545, filed on Aug. 11, 2000.

(51) Int. Cl.[7] .............................. B42D 5/00; G09D 3/00
(52) U.S. Cl. ....................... 345/963; 345/589; 345/593; 345/597; 382/162; 382/165; 358/515
(58) Field of Search ........................ 345/418, 589–591, 345/593, 597, 604, 963; 382/162–167, 154, 277; 358/518–520, 524, 523, 529, 515; 348/675; 283/2, 3, 114

(56) References Cited

U.S. PATENT DOCUMENTS

| | | |
|---|---|---|
| 1,630,247 A | 5/1927 | Adler |
| 1,762,036 A | 6/1930 | Steedle |
| 1,958,192 A | 5/1934 | Fletcher et al. ................... 41/6 |
| 2,203,167 A | 6/1940 | Lodwick .......................... 41/6 |
| 2,512,181 A | 6/1950 | Spears ......................... 35/28.3 |
| 2,636,286 A | 4/1953 | Bowman ..................... 35/28.3 |
| 2,858,624 A | 11/1958 | Bowman ..................... 35/28.3 |
| 2,938,281 A | 5/1960 | Miller ......................... 35/28.3 |
| 2,959,871 A | 11/1960 | Honkavaara .................... 35/28 |
| 3,120,065 A | 2/1964 | Gaudier-Pons .............. 35/28.3 |
| 4,199,877 A | 4/1980 | Akiyama ..................... 35/28.3 |
| 4,665,394 A | 5/1987 | Coles et al. .............. 340/815.1 |
| 4,971,561 A | 11/1990 | Krane .......................... 434/237 |
| 5,033,963 A | 7/1991 | Bourges ....................... 434/98 |
| 5,106,122 A * | 4/1992 | Perelman ....................... 283/2 |
| 5,190,458 A | 3/1993 | Driesener ................... 434/236 |
| 5,311,212 A | 5/1994 | Beretta ........................ 345/150 |
| 5,311,293 A | 5/1994 | MacFarlane et al. ........ 356/421 |
| 5,399,092 A | 3/1995 | Olsen .......................... 434/238 |
| 5,473,738 A | 12/1995 | Hamlin et al. .............. 395/131 |
| 5,542,849 A | 8/1996 | Douglass .................... 434/236 |

(List continued on next page.)

OTHER PUBLICATIONS

Barnes&Nobles.com "Lusher Color Test: The Remarkable Test that Reveals Your Personality Through Color", Pocket Books, Aug. 1971, pp. 1–2.*
WWW.ColorQuiz.com, p. 1, 1998–1999.*
www.sprited–women.com/color/, pp. 1–2, 2001.*
U.S. Patent Application Serial No. 09/637,544 filed Aug. 11, 2000 entitled "Color PreferenceSelf–Help System" by the same applicant.
U.S. Patent Application Serial No. 09/637,545 filed Aug. 11, 2000 entitled "Color Harmonizing Device and Method for Using the Same" by the same applicant.

Primary Examiner—Matthew C. Bella
Assistant Examiner—Wesner Sajous
(74) Attorney, Agent, or Firm—Troutman Sanders LLP; Wm. Brook Lafferty (57) ABSTRACT

A calendar and method for providing personalized messages based on color preferences. The calendar includes a plurality of color representations configured to permit the selection of at least one favorite color representation and at least one least favorite color representation. Each color representation is associated with a different period of time on the calendar. A message is provided which is varied with each period of time and is determined based upon whether the color representation associated with the current period of time corresponds with the favorite and least favorite color representations.

16 Claims, 6 Drawing Sheets

U.S. PATENT DOCUMENTS

| | | | |
|---|---|---|---|
| 5,580,254 A | 12/1996 | Ramsey | 434/236 |
| 5,583,763 A | 12/1996 | Atcheson et al. | 364/551.01 |
| 5,615,320 A | 3/1997 | Lavendel | 395/131 |
| 5,696,981 A | 12/1997 | Shovers | 395/760 |
| 5,729,699 A | 3/1998 | Hashimoto et al. | 395/227 |
| 5,790,091 A | 8/1998 | Hashimoto | 345/150 |
| 5,909,220 A | 6/1999 | Sandow | |
| 5,923,885 A | 7/1999 | Johnson et al. | 395/712 |
| 5,934,707 A * | 8/1999 | Johnson | 283/2 |
| 5,960,406 A * | 9/1999 | Rassansky et al. | 705/9 |
| 6,029,141 A | 2/2000 | Bezos et al. | 705/27 |
| 6,116,656 A * | 9/2000 | Glassman | 283/114 |
| 6,186,553 B1 * | 2/2001 | Phillips et al. | 283/2 |
| 6,280,200 B1 * | 8/2001 | Cunningham | 434/304 |
| 6,481,011 B1 * | 11/2002 | Lemmons | 725/47 |

\* cited by examiner

402 — Sept. 22-Oct.22

404 — Magenta

410 — Magenta inspires you to start something new. Discard your skeptical thoughts. Smile at those you find exciting and show your excitement at situations you enjoy. Your enthusiasms will attract new opportunities. This month you gain the power to be open to the world.

If this month feels:

420 — Exciting; You can keep yourself and see the magic of new situations. New opportunities are arriving every day. Your life is an adventure.

430 — Stressful; You are being very skeptical. Discuss with yourself or a good friend who or what has made you so suspicious. Now practice smiling at who and what you trust.

440 —
Ride the Magenta Wave:
Create a spark. Start by discarding your skeptical thoughts. Focus instead on how exciting a person or place could be. Allow your curiousity, and the quest for something entirely new to rule the moment. Your exciting new body language will positively attract whatever you desire.

You and Your World:
The more you like magenta, the more you are inspired by your environment.

The less you like magenta, the more suspicious you are of new things.

Sept. 13 to Oct.13, 2000
<u>Purple</u>  <u>Full Moon Cycle</u>
 504           506

510 {
Sept. 11    9:34 PM

Today's Color: Yellow

You have the capacity to be more realistic about your future. Clear your mind by pardoning or canceling negative feeling. Now is the time to step back and review the new strengths that your experiences have taught you. Applaud your personal growth and you will better know your full potential
}

530 {
Full Moon: Sept. 13  2:37  PM      Harvest Moon

The aim of life is self development. Use this spiritual empowering full moon to realize your natural passions. Pay attention to your thoughts by being aware, yet not serious. Look particularly at each thing that you enjoy and you will discover your Karma.
}

520 {
Sept. 14    7:00 AM

Today's Color: Lime Green (waning)

Today, you can see who or what is keeping you from <u>growing</u>. Try not to be so serious. Accept how you feel as a fact and you will see new possibilities. Don't let the imposing power of this logical day consume your energy.
}

540 {
Two Week Cycle: Your thoughts have a destinctive need to inspect the world around you. Change is in the air. What and who feels inspiring? non-inspiring? You are concerned with discarding or revamping situations that are no longer an inspiration. During this cycle, you have the power to make your life an exciting adventure.
}

CALENDAR WITH SELF-HELP MESSAGING BASED UPON COLOR PREFERENCES

This application continuation-in-part of U.S. patent application Ser. No. 09/637,544 filed Aug. 11, 2000 entitled "Color Preference Self-Help System," and U.S. patent application Ser. No. 09/637,545 filed Aug. 11, 2000 entitled "Color Harmonizing Device and Method for Using Same."

TECHNICAL FIELD

The present invention relates to calendars and, more particularly, relates to providing self-help guidance based upon color preferences.

BACKGROUND OF THE INVENTION

There is a myriad of calendars available today. These known calendars typically only provide a chronological display of dates. Some also indicate dates of historical significance and holidays. Others also provide pictures or illustrations for each month or day.

However, human behavior is cyclic and calendars can be used to illustrate how one's human behavior changes over time. Although divination based astrology is used for predicting celestial bodies' influence on human affairs, astronomy, which is the scientific study of positions, distribution, motion and composition of celestial bodies, may also be used to study the energy of the universe at large. Known calendars do not identify human behaviors as they are affected by the astronomical movements of the sun and moon and, therefore, can not accurately show you your course in life.

Accordingly, there is a need for an astronomy-based calendar that provides insight to understanding human behavior. The calendar must accurately measure the movements of the sun and moon to identify color energies while providing periodic messages about the world around you.

SUMMARY OF THE INVENTION

The present invention provides a calendar-based self-help system. The calendar of the present invention uses the astronomical movements of the sun and the moon to identify color energies and then identifies human behaviors based on an individual's color preferences.

Generally described, the present invention includes a predetermined set of color representations. Each one of the color representations is associated with an interval of time such as one month. To use the calendar, the user selects their favorite and least favorite colors from the set of colors. The selected colors are compared with the color associated with the current time period which determines the content of the message provided to the user.

The foregoing broadly outlines some of the more pertinent aspects and features of the present invention. These aspects and features, however, should only be construed to be merely illustrative of some of the more prominent features and applications of the invention. One can obtain other beneficial results by applying the disclosed information in a different manner or by modifying the disclosed embodiments. Accordingly, in addition to the scope of the invention defined by the claims, one can obtain other aspects and a more comprehensive understanding of the invention by referring to the detailed description of the exemplary embodiments taken in conjunction with the accompanying drawings.

BRIEF DESCRIPTION OF THE DRAWINGS

Similar reference characters refer to similar parts throughout the several views of the drawings.

DETAILED DESCRIPTION

The present invention permits the identification and understanding of one's personality based upon the selection of their most favorite and least favorite colors from a predetermined set of colors. Although the present invention may be utilized in a variety of applications, the operation of the present invention will be demonstrated by describing specific embodiments. One embodiment of the present invention is a calendar having a table of days, months or seasons printed on a plurality of bound sheets of paper. Other exemplary embodiments of the present invention can exist on a computer-readable medium for use on a computer or on a web page for use on the Internet.

Figure 1:
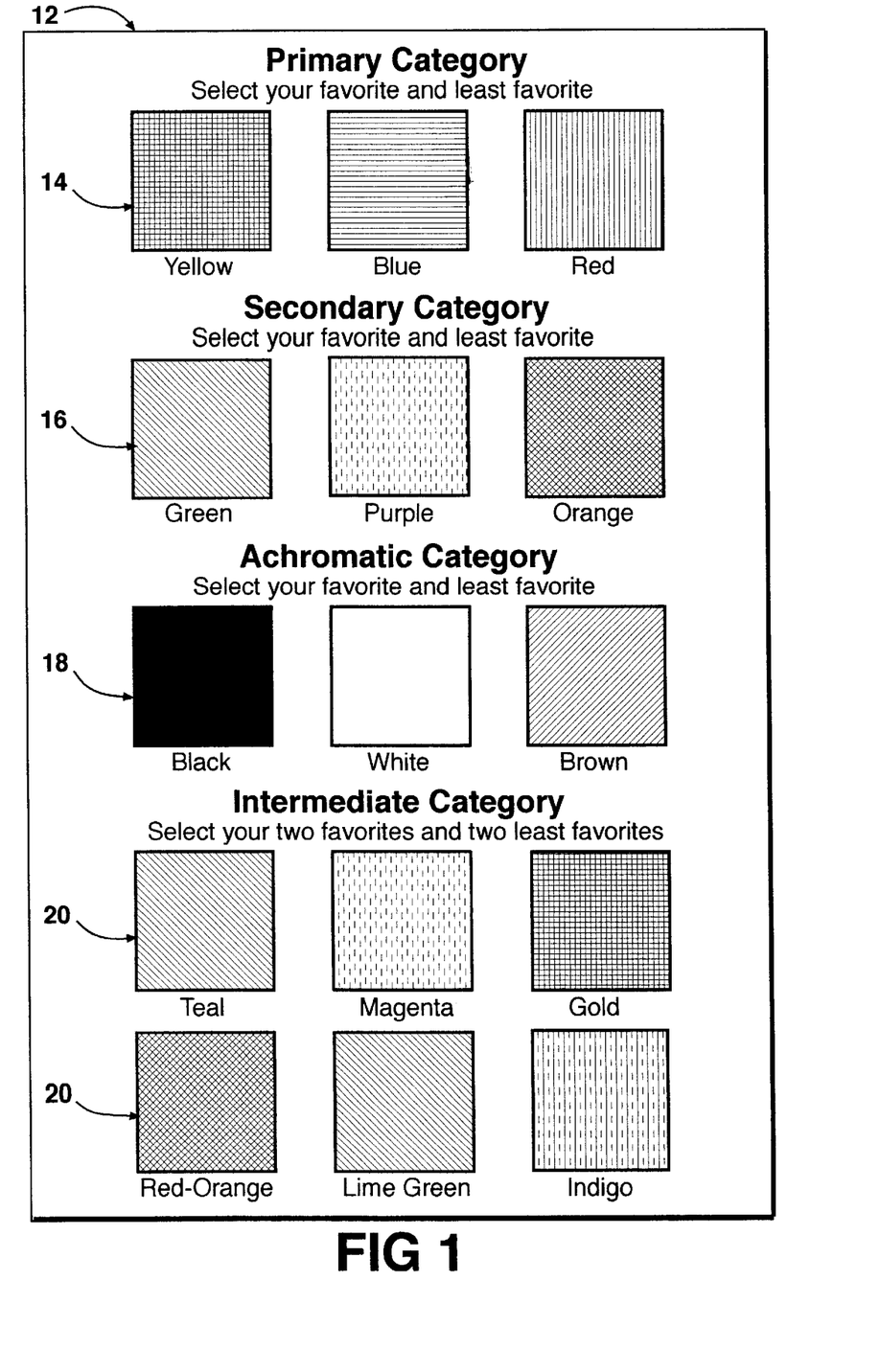
FIG. 1 illustrates an exemplary embodiment of a plurality of color representations of the present invention categorized into separate categories.

The astronomy-based calendar of the present invention is preferably based on the solar and lunar cycles for reckoning the length and divisions of a year. As shown in FIG. 1, the calendar of the present invention includes chart 12 depicting a plurality of color representations. Those skilled in the art understand that slight variations in color often exist from time to time. Often these variations in color result in the printing or fabrication of the color. However, as a result of these variations in color, the colors identified in the present invention are not exact and may be varied slightly. Therefore, the colors are commonly referred to as color representations to indicate some variation in the colors is permissible in the present invention.

The chart 12 includes a primary set 14, a secondary set 16, an achromatic set 18, and an intermediate set 20 of color representations. The primary set of colors 14 are known to be Yellow, Blue and Red. The secondary set of colors 16 are determined by combining two primary colors to achieve the colors Green, Purple and Orange. The achromatic set of colors 18 are black, white and brown and are selected because they provide variations in hue for the primary and secondary colors 14, 16. Finally, the intermediate set of colors 20 are Teal, Magenta, Gold, Red-Orange, Lime Green, and Indigo. The intermediate colors 20 are derived from combining a primary color with a secondary color. For example, Blue and Green combine to make Teal.

The inventor has discovered that one's preference for a particular color from this group of colors is useful in predicting human behavior. The patterns of human behavior are based on evaluation data. In other words, your most favorite and least favorite colors indicate your personality. As a result of using the present invention, one obtains a stronger awareness of oneself with an increased ability to describe how one's life is lived. There are a possible twenty-seven color combinations of the primary, secondary and achromatic sets of colors. The personality characteristic associated with each particular color of a combination of colors are combined with one another. This combination of personality traits is then subject to interpretation and a predicted human behavior is developed. Examples and a further discussion of the use of color preferences to predict human behavior are disclosed in my U.S. patent applications, Ser. Nos. 09/637,544 and 09/637,545, entitled "COLOR PREFERENCE SELF-HELP SYSTEM" and "COLOR HARMONIZING DEVICE AND METHOD OF USING THE SAME", respectively, the disclosures of which are incorporated herein by reference.

Figure 2:
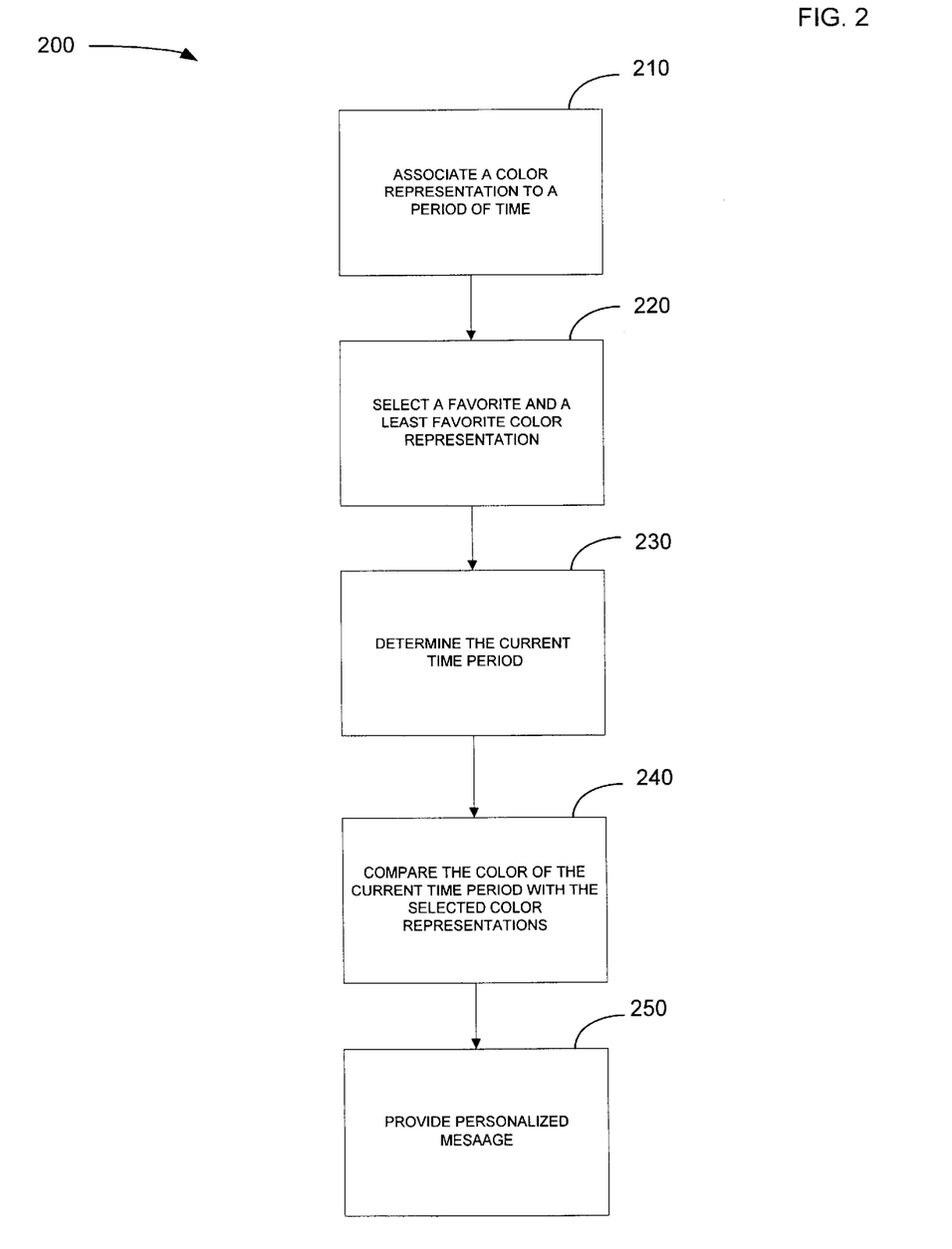
FIG. 2 illustrates an exemplary embodiment of a flowchart of the present invention.

FIG. 2 illustrates an exemplary embodiment of a flow-chart of a method 200. The use of the system of the present invention constitutes an inventive method in addition to a calendar itself. In practicing the method 200, the steps include providing a plurality of color representations which include the primary set of color representations 14, a secondary set of color representations 16, an achromatic set of color representations 18, and an intermediate set of color representations 20. A predicted human behavior is associated with each color of the plurality of color representations.

As shown in FIG. 2 in process block 210, the method 200 includes the step of associating each color representation to a different period of time. The color representations are preferably shown on the calendar alongside their corresponding color representations. The preferred arrangement is to associate color representations with the specific periods of time which corresponds with the twelve commonly known zodiac signs as shown below:

Astrological Connection to Color

| Color | Zodiac Sign | Sun (time period) |
| --- | --- | --- |
| Lime Green | Aries | March 20–April 19 |
| Green | Taurus | April 19–May 20 |
| Teal | Gemini | May 20–June 20 |
| Blue | Cancer | June 20–July 22 |
| Indigo | Leo | July 22–August 22 |
| Purple | Virgo | August 22–September 22 |
| Magenta | Libra | September 22–October 22 |
| Red | Scorpio | October 22–November 22 |
| Red Orange | Sagittarius | November 21–December 21 |
| Orange | Capricorn | December 21–January 21 |
| Gold | Aquarius | January 21–February 19 |
| Yellow | Pisces | February 19–March 20 |

The method 200 then includes the step of selecting a favorite and a least favorite from the color representations as shown in process block 220. The invention also includes the step of determining the current time period. Process block 230 illustrates this step in FIG. 2. The current time period may be any length of time, but preferably is described in terms of months, weeks or days. More particularly, two-week intervals and periods of approximately two and one-quarter days may be used. For example, if the user is interested in receiving a daily message, the user locates the current day on the calendar. Alternatively, if the user is interested in receiving a monthly message, the user locates the current month on the calendar.

Figure 3:
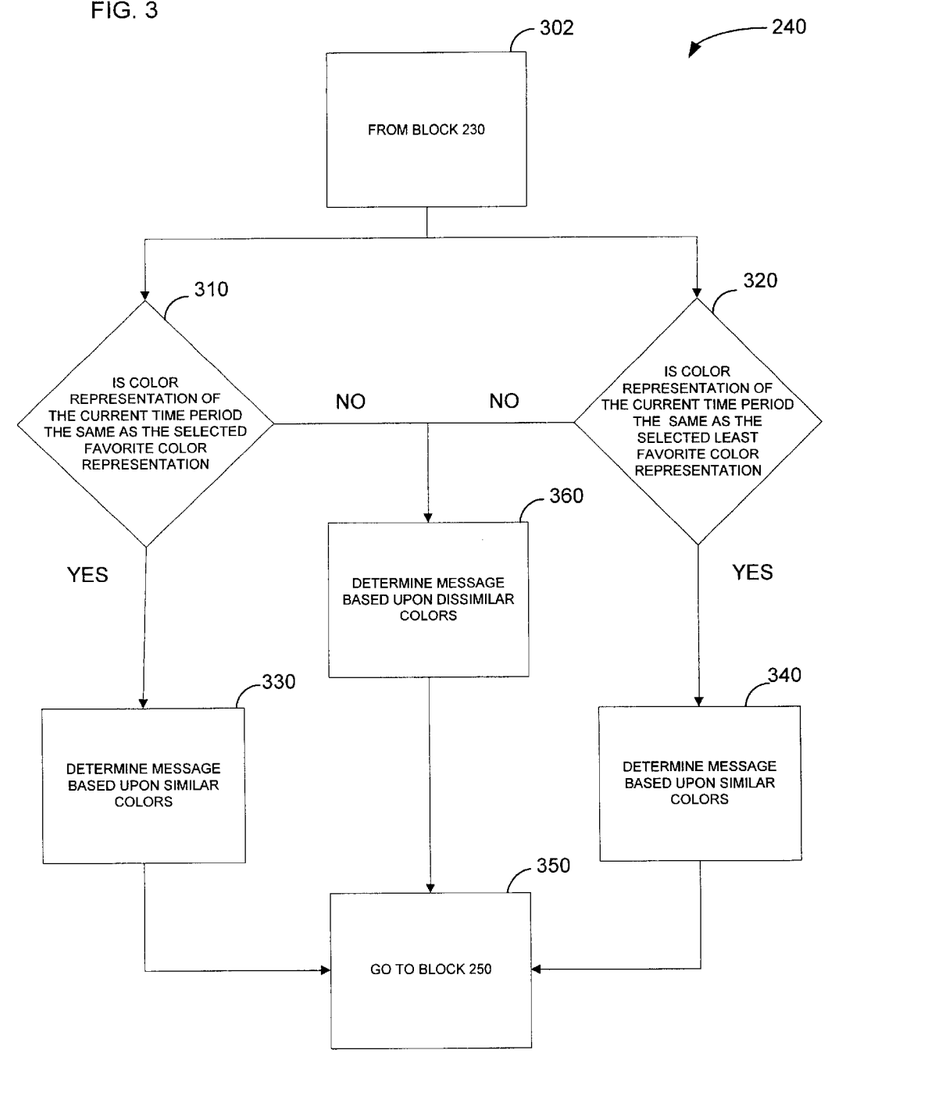
FIG. 3 illustrates an exemplary embodiment of a subroutine called for in the flowchart of FIG. 2.

Next, as shown in process block 240, the method 200 includes comparing the color representation associated with the current time period selected my the user with the user's selected favorite and least favorite color representations. A more detailed description of the function of process block 240 is shown in FIG. 3, discussed below. The method 200 then also includes the step of providing a personalized message to the user based upon interpretations of the combination of the selection of the favorite and least favorite color representations with the color representation associated with the current time period.

FIG. 3 illustrates an exemplary embodiment of a subroutine called for in process block 240 of FIG. 2. As shown in FIG. 3, the subroutine of process block 240 commences from process block 230 described above. From process block 230, the subroutine follows two paths to different decision blocks 310 and 320. In decision blocks 310 and 320, a comparison is conducted to determine whether the color representation of the current time period corresponds with the selected favorite or least favorite color representations, respectively.

In decision block 310, if the color representation of the current time period is the same as the selected favorite color representation, the YES branch is followed to process block 330 where the appropriate message is determined. When the color representation associated with the current time period is the user's selected favorite color representation, the message is primarily determined based upon the predicted pattern of human behavior associated with the particular color reference as determined by the evaluation data.

On the other hand, in decision block 320, if the color representation of the current time period is the same as the selected least favorite color representation, the YES branch is followed to process block 340 where the appropriate message is determined. When the color representation associated with the current time period is the user's selected least favorite color representation, the message is again primarily determined based upon the predicted pattern of human behavior associated with the particular color reference as determined by the evaluation data.

However, if the color representation of the current time period is different from both of the selected color representations, the NO branches from the decision blocks 310 and 320 are followed to process block 360. In process block 360, a message is determined based upon interpretations of the combination of the selected favorite and least favorite color representations with the color representation associated with the current time period. In any case, after the content of the message is determined, the subroutine continues back to process block 250 described above.

The messages of the present invention take into consideration known principles of the color wheel. On the color wheel, the three primary colors are equally spaced about a circle and, in between each pair of primary colors, is a secondary color for a total of six colors at this point. For example, between Yellow and Blue is Green. Moreover, the remaining six intermediate colors are equally spaced about the circle based upon their relationship to the six primary and secondary colors. Accordingly, there is a grand total of twelve colors around the circle.

The messages provided through the use of the present invention may be based upon the distance between two colors on the circle. The distance between two colors is commonly referred to as angles. For example, Green is a color wheel distance of "1" from Teal and a color wheel distance of "2" from Blue. In another example, Green is a color wheel distance of "9" from Gold and a color wheel distance of "10" from Yellow. The furthest a color representation can be from another color representation is a color wheel distance of "11," after which the angle starts over.

The color wheel may be used to correspond with the cycle of the moon. A new moon corresponds with the beginning of the color wheel. As the colors change as you go around the color wheel, so does the position of the moon until a new moon rises after crossing over the starting point on the color wheel. Thus, the messages provided by the use of the present invention may be based upon the relationship of one color to another on the color wheel. For example, if a color representation associated with a particular month corresponds with a color representation selected as the favorite color, the resulting match is interpreted as signaling a new beginning. In such case, the color wheel distance is "0." This is considered a good time to begin a new project or reestablish your thoughts about your future. However, other combinations of colors do not connect without a lot of effort. For example, Green and Gold are a color wheel distance of "9" away from each other and, therefore, are considered confrontational.

In accordance with the exemplary embodiment of the present invention, the calendar of the present invention preferably also includes a plurality of pages or portions of pages for describing the predicted human behaviors. The predicted human behaviors are identified by indicia contained on each of the pages.

Figure 4:
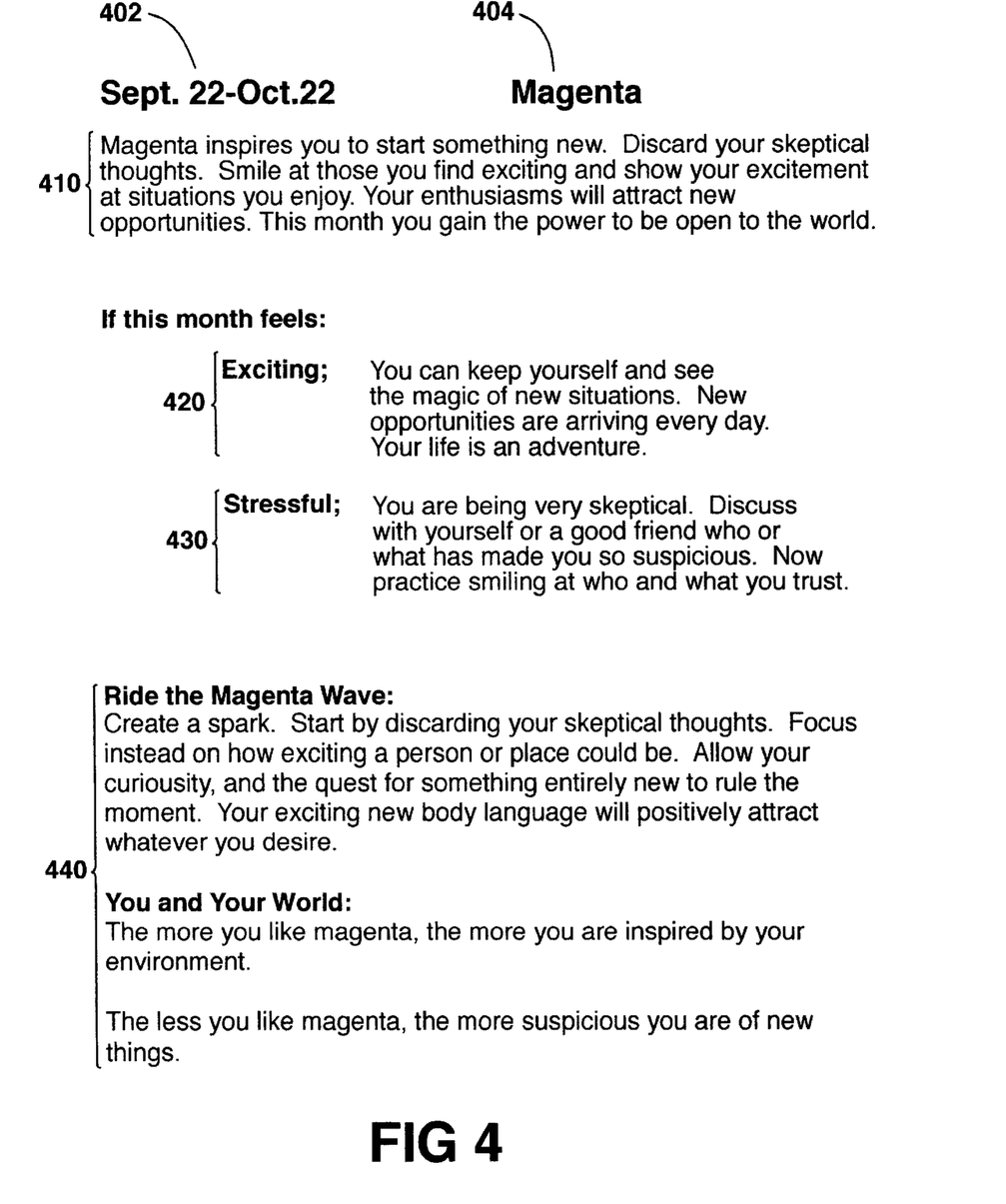
FIG. 4 illustrates an exemplary embodiment of the indicia describing predicted human behavior associated with a particular color reference during a particular time period corresponding with a zodiac sign.

For example, FIG. 4 depicts a message for a time period 402 (September 2-October. 22) corresponding with the Libra zodiac sign and the predicted human behaviors associated with selecting a particular color representation identified by reference numeral 404, in this case Magenta, as either of one's favorite or least favorite color. The predicted human behavior is preferably indicated by text, as shown in FIG. 4, but may alternatively be depicted by caricatures or other illustrations.

FIG. 4 also includes various areas of grouped text to describe multiple features of the predicted human behavior. A description of motivations and empowering ideas may also be associated with the color. A description of cautionary and opportunistic ideas may be associated with the color as well. A subsequent page or portion includes the predicted human behavior associated with other color representations when selected as either the favorite or least favorite color representations for other periods of time.

The messages of the present invention are what you promise yourself you will accomplish over this period of time. In reading a message, you tap into the motivational forces behind your thoughts and you may consider the implications of your thoughts to better plan and direct your life.

For example, each day your thoughts are consumed by different people and situations. The messages will let the universe speak for you. As a result you will be on the ball and you will better know which circumstances command your attention or which circumstances you simply can not forget. Therefore, you will be able to plan ahead to make every situation a success and your live more meaningful. Knowing your thoughts beforehand will be empowering.

More frequent daily messages tap into what each day is requesting from you. Reading your daily message will tune you into your body, mind and soul. Therefore, you can use the daily messages to gauge the pluses and minuses of your feelings and then allow you to turn your energy inward, outward, up or down.

FIG. 4 illustrates a typical message which may be provided for the time period associated with the Libra zodiac sign where the user has selected Magenta as either a favorite or least favorite color representation. In FIG. 4, there are multiple areas of grouped text, such as those identified by reference numerals 410, 420 and 430. Other areas of group text, such as the area of grouped text 440, may be used to provide additional information. The area of grouped text identified by reference numeral 410 describes general aspects of the human behavior typically identified with Magenta. Grouped text areas 420 and 430 provide more specific details during this time period under the Libra zodiac sign when Magenta is selected as a favorite or least favorite color representation, respectively.

Figure 5:
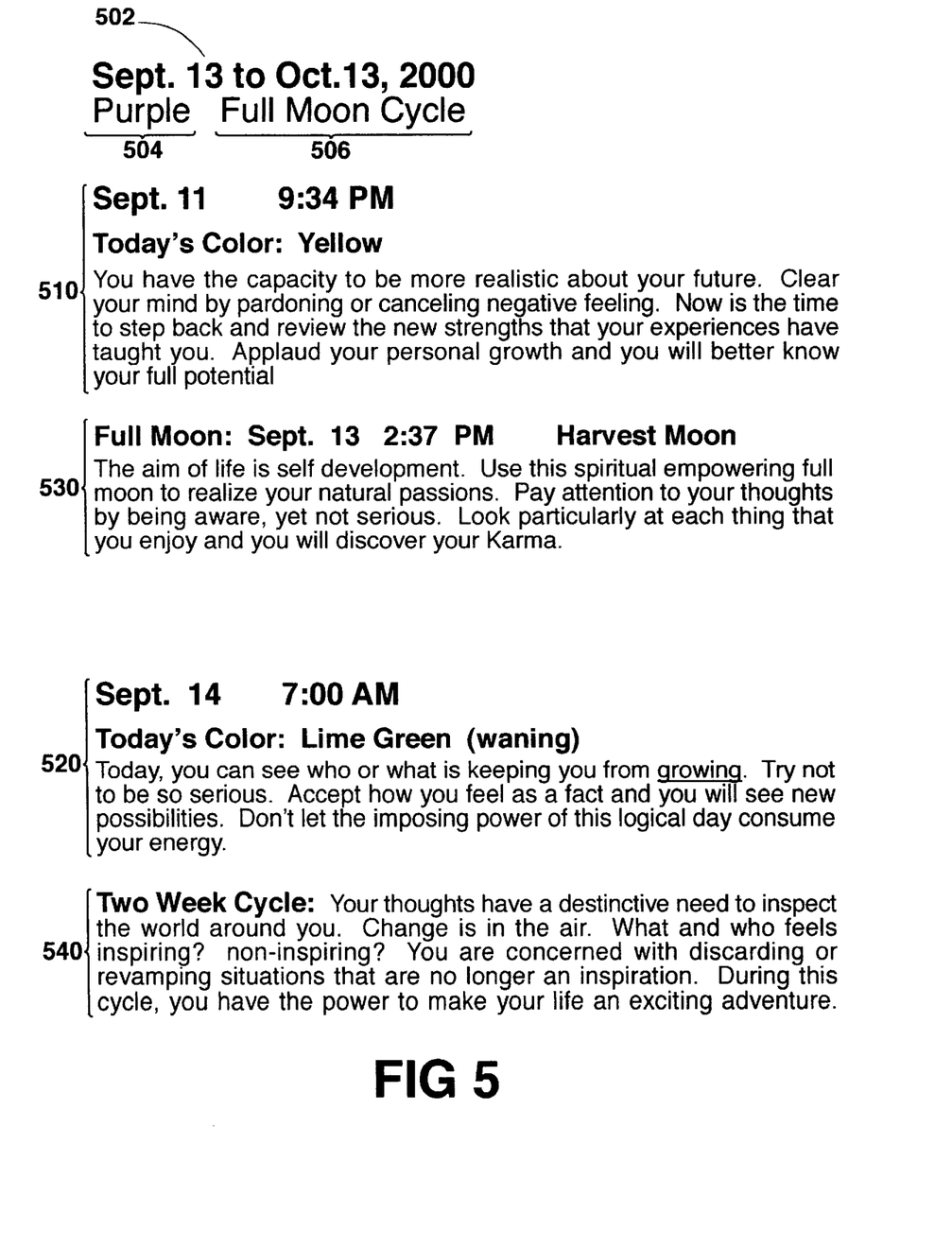
FIG. 5 illustrates an exemplary embodiment of the indicia describing predicted human behavior associated with a particular color reference during a particular time period corresponding with a pair of different days.

FIG. 5 depicts two separate daily messages 510 and 520 for specific dates within a time period 502 (Sep. 13 to Oct. 13, 2000) which corresponds with the color Purple, identified by reference numeral 504. Grouped text areas 530 and 540 are provided to highlight useful messaging corresponding in particular with the date of the fill moon and a particular two week cycle, respectively.

In another exemplary embodiment, the present invention may be conveniently implemented in one or more program modules as well as hardware components. The method 200 may be stored on a computer-readable medium. On the computer-readable medium is stored one or more program modules of a computer program for identifying patterns of human behavior. The computer program includes instructions which, when executed by a computer, perform the steps of method 200 as described above.

The present invention may conveniently be implemented in a program language such as "C"; however, no particular programming language has been indicated for carrying out the various tasks described because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the present invention, it is not practical to provide a representative example of a computer program that would be applicable to this system. Each user of a particular platform would be aware of the language and tools which are more useful for that user's needs and purposes to implement the instant invention.

In one exemplary embodiment, the present invention includes a computer generally consisting of a processing unit which interfaces to a memory storage device, a display device and a user input device. An interface device may support at least one access line connecting the computer to the Internet. The access line may consist of analog or digital interfaces, and supports the process of transmitting and receiving analog or digital data in real-time or otherwise.

The memory storage device is operative to store a program module for implementing the present invention. For example, the present invention implemented as a computer program running on the computer, provides an interface to a user via the display device. The processing unit is responsive to instructions of the program module. In general, the program module can also transport data over the access line into the interface device. Periodic updates are used to provide current information and to maintain system integrity. Update frequency is determined based on system demands.

Figure 6:
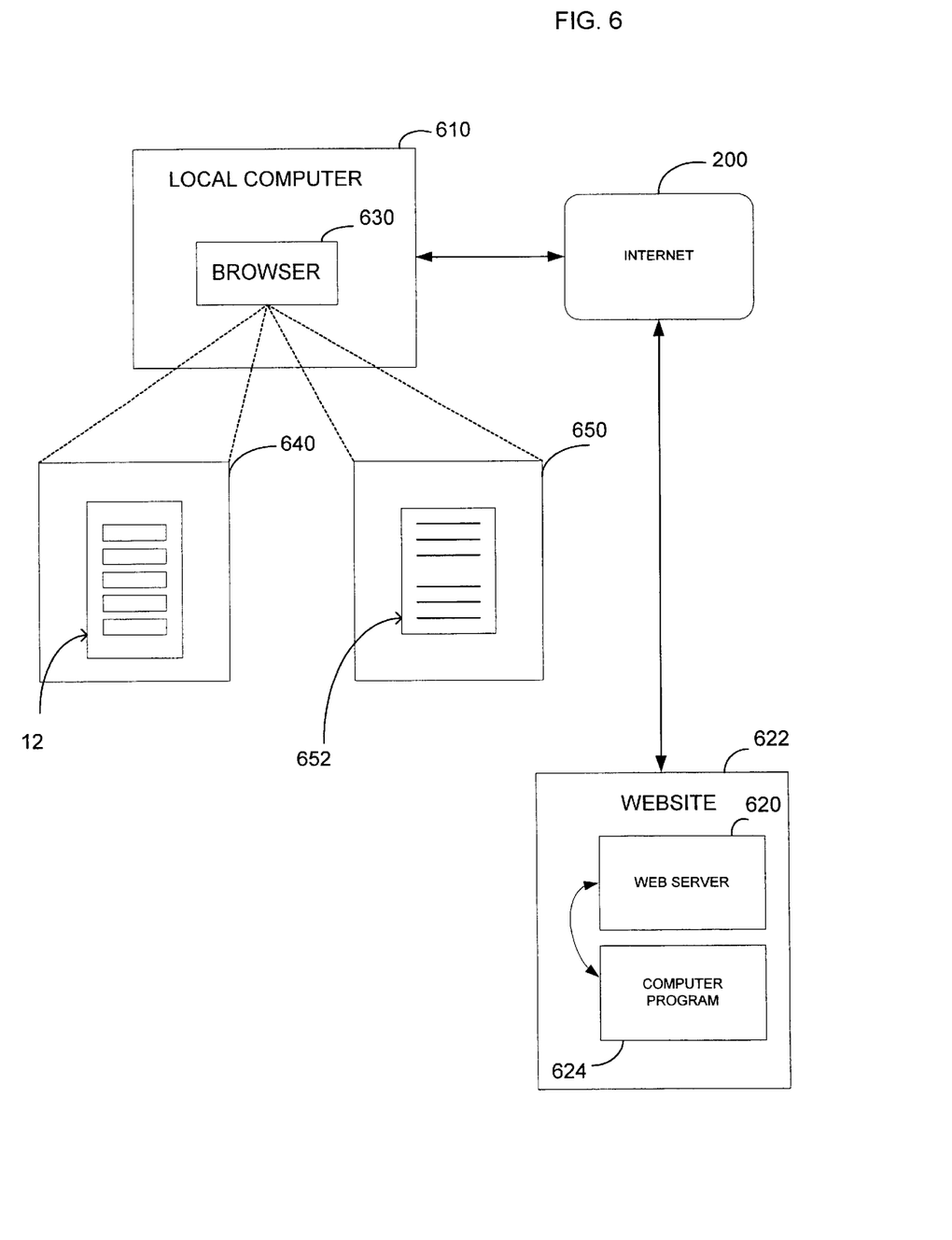
FIG. 6 illustrates an exemplary embodiment of the present invention operating within the environment of the Internet on a web site.

The method of the present invention may also be implemented as a web-based application as shown in FIG. 6. In this exemplary embodiment, the present invention may be maintained on a network such as the World Wide Web and is invoked by accessing the Internet 600 using a local computer 610 and an existing Internet Service Provider to contact a server 620 or series of servers for accessing a web site 622. The server 620 initiates a computer program 624 to conduct processing steps. The local computer 610 and the server 620 communicate via the Internet's File Transfer Protocol, commonly referred to as FTP. Alternatively, other technologies such as the HTTP protocol of the Web can be used for uploading and downloading files. The server 620 locates and sends the information for practicing the present invention to a web browser 630, which displays web pages having the requested information on the local computer.

As shown in FIG. 6, web page 640 includes chart 12, as described above, and web page 650 includes the predicted human behavior in text 652 associated with the selected color or combination of colors displayed on web page 640. To view the files of the present invention, the user may utilize a helper application or a plug-in. The user configures the web browser to launch these helper applications or plug-ins which are then used for performing the various tasks described above. A color snapshot of the user's selections may be generated to confirm his or her selections and may then be downloaded. The snapshot includes the identified human behavior corresponding with the selected color combination.

Hyperlinks may serve to connect one document or portion of a document to another and even one web site to another. For example, one document with the color representations may be linked to another document with the corresponding, predicted human behaviors. Various organizational structures may be used to connect the selected combinations of color representations with the appropriate corresponding, predicted human behavior.

In another embodiment, users can download software from a network, such as the World Wide Web, to be installed on the local computer to practice the method 200 as described above. Internal computer networks commonly referred to as Intranets may also be used.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A calendar comprising:
    a plurality of color representations arranged to permit the selection of at least one favorite color representation and at least one least favorite color representation, each color representation associated with a different period of rime displayed on said calendar, predicted human behaviors associated wit said favorite and least favorite color representations selected from said plurality of color representations; and
    a message varied with each period of time and determined based upon whether said color representation associated wit the current said period of time corresponds with either of said favorite and least favorite color representations.

2. The calendar of claim 1 wherein said period of time is a month.

3. The calendar of claim 1 wherein said period of time is a day.

4. The calendar of claim 1 wherein said period of time is two weeks.

5. The calendar of claim 1 wherein said period of time is approximately two and one quarter days.

6. The calendar of claim 1 wherein said message is a monthly message.

7. The calendar of claim 1 wherein said message is a daily message.

8. The calendar of claim 1 wherein each said period of time corresponds with a zodiac sign.

9. The calendar of claim 1 wherein said favorite color representation corresponds with said color representation associated with the current said time period.

10. The calendar of claim 1 wherein said least favorite color representation corresponds with the current said time period.

11. The calendar of claim 1 wherein said plurality of color representations comprise:
    a primary set of color representations;
    a secondary set of color representations;
    an achromatic set of color representations; and
    an intermediate set of color representations.

12. A method of providing a personalized message from a calendar, said method comprising the steps of:
    associating a plurality of color representations with periods of time represented on the calendar;
    selecting from said plurality of color representations at least one favorite and at least one least favorite color representation;
    identifying predicted human behaviors associated with said favorite and least favorite color representations selected from said plurality of color representations;
    comparing said favorite and said least favorite color representations with the current said time period; and
    in response to said comparing step, providing the personalized message.

13. The method of claim 12 wherein said comparison step comprises subjecting to interpretation the selections of said favorite and least favorite color representations.

14. A computer-readable medium on which is stored a computer program for providing a calendar with personalized messages, said computer program comprising instructions which, when executed by a computer, perform the steps of:
    associating a plurality of color representations with periods of time represented on the calendar;
    permitting a user to select from said plurality of color representations at least one favorite and at least one least favorite color representation;
    identifying predicted human behaviors associated with said favorite and least favorite color representations selected front said plurality of color representations;
    comparing said favorite and said least favorite color representations with the current said time period; and
    in response to said comparing step, providing the personalized message to the user.

15. A method enabling a user to receive a personalized message from viewing a calendar on a web sire responsive to identifications of color preferences, using a computer and a telecommunications link between the computer and the web site, the method comprising the steps of:
    providing a web page to the computer;
    in response to providing said web page, associating a plurality of color representations with periods of time represented on the calendar;

permitting a user to select from said plurality of color representations at least one favorite and at least one least favorite color representation;

identifying predicted human behaviors associated with said favorite and least favorite color representations selected from said plurality of color representations;

comparing said favorite and said least favorite color representations with the current said rime period; and in response to said comparing step, providing the personalized message to the user.

16. A hypermedia document for providing personalized messages from a calendar, said hypermedia document comprising a plurality of hyperlinks providing access to a plurality of files stored on a web site, at least one of said files including one or more of said hyperlinks to other of said files, one of said files depicting a plurality of color representations arranged to permit the selection of at least one favorite color representation and at least one least favorite color representations from said plurality of color representations, each color representation associated with a different period of time of said calendar; predicted human behaviors associated with said favorite and least favorite color representations selected from said plurality of color representations; and a message varied with each period of time and determined based upon whether said color representation associated with the current said period of time corresponds with either of said favorite and least favorite color representations.

* * * * *